US005636072A

United States Patent [19]

Shibata et al.

[11] Patent Number: 5,636,072

[45] Date of Patent: Jun. 3, 1997

[54] DISPLAY ELEMENT AND DISPLAY APPARATUS

[75] Inventors: Kazuyoshi Shibata, Nagoya; Yukihisa Takeuchi, Nishikamo, both of Japan; Hugh F. Frohbach, Sunnyvale, Calif.; Eric J. Shrader, Belmont, Calif.; Ronald E. Pelrine, Menlo Park, Calif.

[73] Assignee: NGK Insulators, Ltd., Japan

[21] Appl. No.: 420,783

[22] Filed: Apr. 12, 1995

Related U.S. Application Data

[63] Continuation of Ser. No. 221,015, Apr. 1, 1994, abandoned.

[51] Int. Cl.[6] .......... G02B 26/08

[52] U.S. Cl. .......... 359/896; 359/196; 310/328

[58] Field of Search .......... 359/196, 222–224, 359/291, 896; 310/311, 317, 320, 328, 363–368; 348/739, 744, 750, 755–756, 759–760; 345/30, 48, 84–85, 108

[56] References Cited

U.S. PATENT DOCUMENTS

| | | | |
|---|---|---|---|
| 3,654,476 | 4/1972 | Hakki | 250/552 |
| 4,113,360 | 9/1978 | Baur et al. . | |
| 5,126,615 | 6/1992 | Takeuchi et al. | 310/330 |
| 5,210,455 | 5/1993 | Takeuchi et al. | 310/328 |
| 5,281,888 | 1/1994 | Takahashi et al. | 310/366 |

FOREIGN PATENT DOCUMENTS

| | | |
|---|---|---|
| 0039883 | 11/1981 | European Pat. Off. . |
| 0565883 | 10/1983 | European Pat. Off. . |

OTHER PUBLICATIONS

Patent Abstracts of Japan, vol. 16, No. 330 (P-1388), 17 Jul. 1992.

IBM Technical Disclosure Bulletin, vol. 30, No. 6, Nov. 1987.

*Primary Examiner*—James Phan

*Attorney, Agent, or Firm*—Parkhurst, Wendel & Burr, L.L.P.

[57] ABSTRACT

A display element includes: an actuator including a piezoelectric film having a pair of surfaces and a pair of electrodes coated onto at least a portion of each of a pair of respective surfaces of the piezoelectric film; a movable flexing portion, in contact with one of the pair of electrodes, to support the actuator; a fixed portion for holding the flexing portion so that the flexing portion can move; means, connected to the actuator, for transmitting a displacement of the actuator; and a plate for transmitting light, disposed closely to the displacement-transmitting means. In this display element, a voltage is applied into the actuator through the pair of electrodes so as to control a rest position and a displacement of the actuator as well as a contact and a separation between the displacement-transmitting means and the plate so that a light emission at a predetermined position in the plate is controlled. Alternatively, a display element may include a laminated piezoelectric body having a plurality of piezoelectric layers and a plurality of electrode layers, wherein the piezoelectric layers and the electric layers are laminated. A display apparatus includes a plurality of display elements. The display element and the display apparatus have quick response, consume little electric power, have a small size, and have high brightness of a screen. Further, a colored screen does not need to increase the number of picture elements in comparison with a monochrome screen.

4 Claims, 3 Drawing Sheets

DISPLAY ELEMENT AND DISPLAY APPARATUS

This application is a continuing application of U.S. Ser. No. 08/221,015, filed Apr. 1, 1994, now abandoned.

BACKGROUND OF THE INVENTION AND RELATED ART STATEMENT

The present invention relates to a display element and a display apparatus. The display element consumes little electric power and has high screen brightness.

As conventional display apparatuses, a CRT (cathode-ray tube) and a liquid crystal display have been known.

An ordinary TV is known as a CRT. The screen is bright. However, CRT consumes much electric power and the whole display apparatus is deep in comparison with the size of the screen.

On the other hand, a liquid crystal has the advantages of a compact display and consuming little electric power. However, brightness of the screen is inferior to that of a CRT, and the visual angle of the screen is narrow.

Further, a CRT and a liquid crystal each having a colored screen has the number of pixells three times as that of a monochrome, has a complex structure, consumes much electric power, and costs a lot.

Therefore, the objects of the present invention are to solve the problems the conventional display apparatuses have and to provide a display element and a display apparatus, both consuming little electric power, having a small size, and having high screen brightness.

SUMMARY OF THE INVENTION

In order to achieve the aforementioned objects, the first aspect of the present invention is to provide a display element having: an actuator including a piezoelectric film and a pair of electrodes coated onto at least a portion of a pair of respective surface of the piezoelectric film; a movable portion, in contact with one of the pair of electrodes, for supporting the actuator; a fixed portion for holding the movable portion so that the movable portion, in being connected to the actuator, can transmit a displacement to the actuator; and a plate for transmitting light, disposed closely to the displacement-transmitting means; wherein a voltage is applied into the actuator through the pair of electrodes so as to control the displacement of the actuator to cause selectively either a contact or a separation between the displacement-transmitting means and the plate so that a light emission at a predetermined position in the plate is controlled.

In the present invention, the movable portion and the fixed portion are preferably portions of a ceramic substrate having a unitary structure. The ceramic substrate is preferably formed of a cavity so that the movable portion is thin and has a plate shape.

Another aspect of the present invention is to provide a display apparatus (Invention B) including a plurality of display elements having: an actuator including a piezoelectric film having a pair of surfaces and a pair of electrodes coated onto at least a portion of a pair of respective surfaces of the piezoelectric film; a movable portion, in contact with one of the pair of electrodes, for supporting the actuator; a fixed portion for holding the movable portion so that the movable portion, in being connected to the actuator, can transmit a displacement to the actuator; and a plate for transmitting light, disposed closely to the displacement-transmitting means; wherein a voltage is applied into the actuator through the pair of electrodes so as to control the displacement of the actuator to cause selectively either a contact or a separation between the displacement-transmitting means and the plate so that a light emission at a predetermined position in the plate is controlled.

Still another aspect of the present invention is to provide a display element (Invention C) including: a laminated actuator including a laminated piezoelectric body including a plurality of piezoelectric layers and a plurality of electrode layers, wherein the piezoelectric layers and the electrode layers are laminated; fixed portion for holding the laminated actuator means, connected to the actuator, for transmitting a displacement of the actuator; and a plate for transmitting light, disposed closely to the displacement-transmitting means; wherein a voltage is applied into the laminated actuator through the pair of electrodes so as to control the displacement of the laminated actuator to cause selectively either a contact or a separation between the displacement-transmitting means and the plate so that a light emission at a predetermined position in the plate is controlled.

Yet another aspect of the present invention is to provide a display apparatus (Invention D) including a plurality of display elements having: a laminated actuator including a laminated piezoelectric body including a plurality of piezoelectric layers and a plurality of electrode layers, wherein the piezoelectric layers and the electrode layers are laminated; a fixed portion for holding the laminated actuator means, connected to the actuator, for transmitting a displacement of the actuator; and a plate for transmitting light, disposed closely to the displacement-transmitting means; wherein a voltage is applied into the laminated actuator through the pair of electrodes so as to control a rest position and a displacement of the laminated actuator to cause selectively either a contact or a separation between the displacement-transmitting means and the plate so that a light emission at a predetermined position in the plate is controlled.

DETAILED DESCRIPTION OF THE INVENTION

Figure 1:
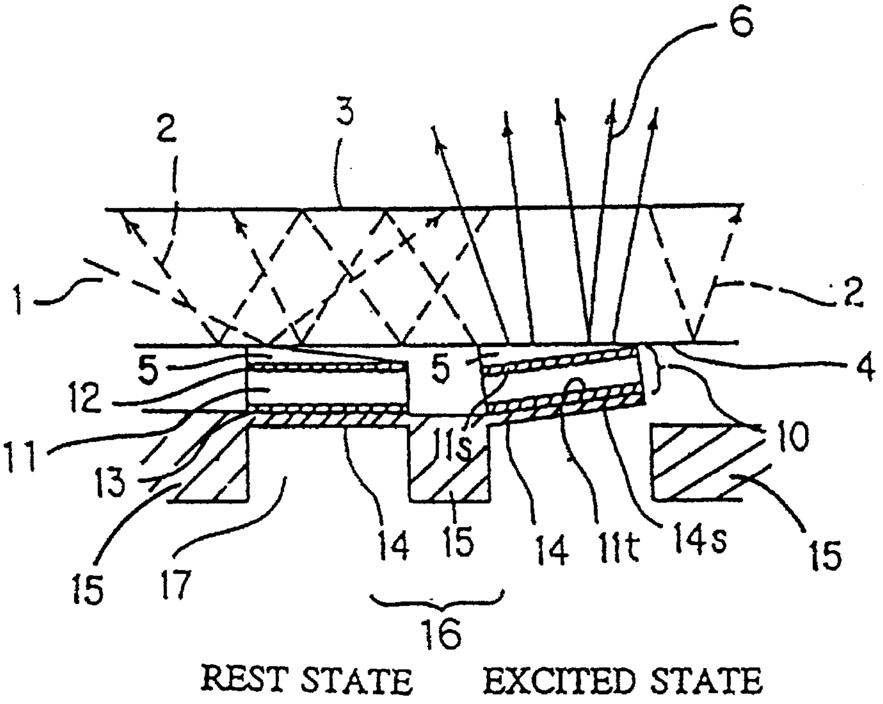
FIG. 1 is a schematic showing an embodiment of a display dement (Invention A) of the present invention.

The fundamental principle of the present invention is described on the basis of FIG. 1.

The light 2 is introduced into the plate 1 for transmitting light from one end of the plate 1. The refractive index of the plate 1 is controlled so that all the light 2 totally reflects without penetrating the front surface 3 and the back surface 4 so as to pass inside the plate 1. In this condition, when any substance (displacement transmission in the present invention) 5 contacts at a distance not longer than a wave length, the light 2 penetrates the back surface 4 and reaches the surface of the substance 5. The light 2 reflects on the surface of the substance 5 so as to become a scattering light 6 which penetrates into the plate 1. A part of the scattering light 6 totally reflects in the plate 1. However, most of the scattering light 6 penetrates the front surface 3 of the plate 1.

As obvious from the foregoing description, the presence or the absence of a light emission (leaking light) of the light 2 on the front surface 3 of the plate 1 can be controlled by contacting or separating the substance 5 at the back surface 4 of the plate 1.

The aforementioned presence or absence of the light emission, i.e., a unit of switching-on and switching-off, acts as a picture element (pixell) as well as a conventional CRT and a liquid crystal display. A plurality of picture elements are disposed both vertically and horizontally. Switching-on and switching-off of each picture element is controlled so as to display any letter, figure, etc.

Next, the application of the present invention to a color screen is described.

It is thought that human beings recognize colors by mixing the three primary colors remaining in their optic nerves. If so, the function and the effect are achieved in the vision of human beings. The function and the effect are similar to the present color display in which the three primary colors are mixed.

The fundamental principle of the coloring of the present invention is hereinbelow described.

The fundamental condition of coloring is determined by a mixing method of R (red), G (green), and B (blue).

Figure 2:
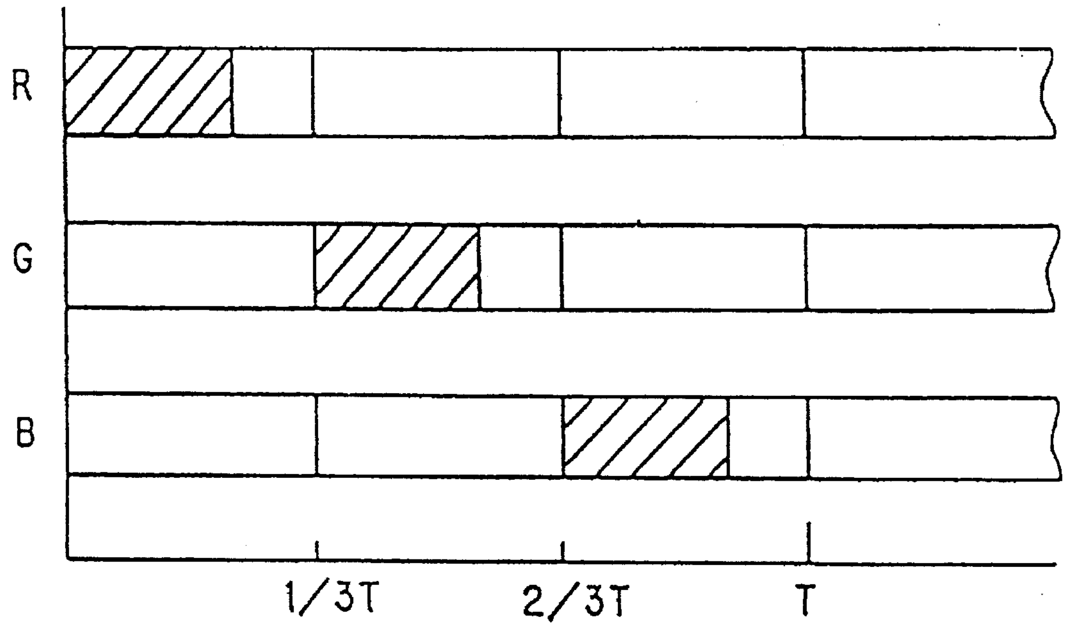
FIG. 2 is an explanatory view showing an example of a ratio of periods for light emissions of R (red), G (green), and B (blue).
Figure 3:
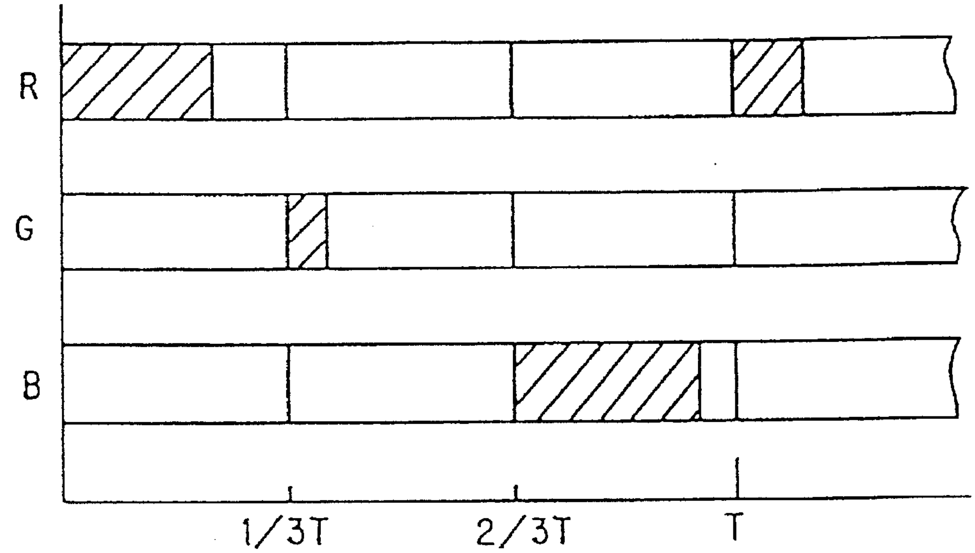
FIG. 3 is an explanatory view showing another example of a ratio of periods for light emissions of R, G, and B.

T is a frequency of color emission. The longest color-emitting period of R, G, and B is divided into three. When the ratio of each of the color-emitting periods of R, G, and B is 1:1:1 as shown in FIG. 2, the color becomes white. When the ratio of each of the color-emitting periods of R, G, and B is 4:1:5, the color corresponds to the ratio.

Therefore, referring to FIG. 1, the color may be controlled by controlling each of the periods of light emission of the three primary colors so as to correspond the period of contacting the displacement-transmitting portion 5 with the plate 1 to the frequency of the color-emitting period. Alternatively, the period of contacting the displacement-transmitting portion 5 with the plate 1 may be controlled so as to correspond the period of light emission to the frequency of the color-emitting period.

Therefore, the present invention advantageously does not require to increase the number of picture elements for a colored screen in comparison with a monochrome screen.

The present invention is hereinbelow described in more detail on the basis of Embodiments. However, the present invention is not limited to these Embodiments.

FIG. 1 is a schematic showing an embodiment of a display element (Invention A) of the present invention. The left element is in a rest condition, and the right element is in an excited condition.

In FIG. 1, an actuator 10 includes a piezoelectric film 11 made of ceramic and a pair of electrodes 12 and 13 covering each surface of the piezoelectric film 11. Under each of the actuator 10 is disposed a substrate 16 having a movable portion 14 and a fixed portion 15. The lower electrode 13 of the actuator 10 contacts with the movable portion 14 so as to directly support the actuator 10.

Preferably, the substrate 16 is made of ceramic and has a unitary structure including the movable portion 14 and the fixed portion 15. Further, the substrate 16 preferably has a cavity 17 so that the movable portion 14 is thin.

The fixed portion 15 is disposed so as to surround the movable portion 14.

Note that the movable portion 14 and the fixed portion 15 may not be formed unitarily. For example, a metallic fixing portion 15 may fix a ceramic movable portion 14. When the fixing portion 15 is metallic, the surface of the movable portion 14 to be connected to the fixing portion is metallized. The metallized layer is soldered to the fixed portion 15. The fixed portion 15 may be made of metal such as stainless steel and iron.

The fixed portion 15 is disposed so as to surround the movable portion 14. However, the fixed portion 15 may not support the movable portion 14 at all the circumference thereof, and the fixed portion 15 has only to support at least a part of the movable portion 14. In FIG. 1, only a part of the movable portion 14 is supported by the fixed portion 15.

To the upper electrode 12 of each of the actuator 10, a displacement-transmitting portion 5 is connected so as to enlarge the area for contacting with the plate 1 to a predetermined degree. In FIG. 1, the displacement-transmitting portion 5 is disposed close to the plate 1 when the actuator is in a standing condition. When the actuator 10 is in an excited condition, the displacement-transmitting portion 5 contacts to the plate 1 at a distance of at most the wave length of the light. In FIG. 1, the displacement-transmitting portion 5 is formed of a member having a triangle cross-section.

Figure 4:
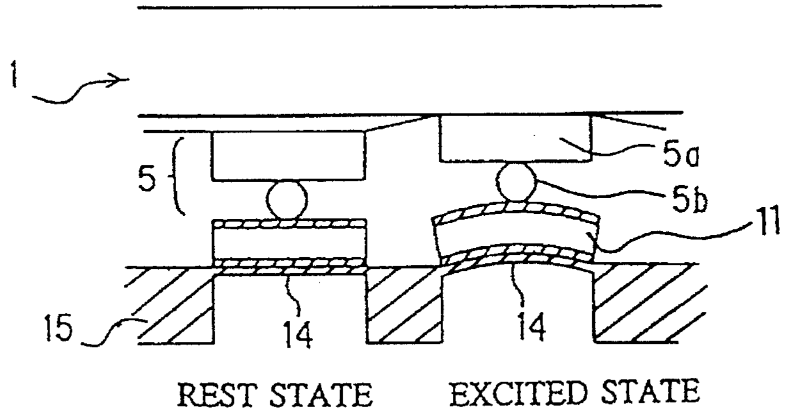
FIG. 4 is a schematic showing another embodiment of a display element of the present invention.

FIG. 4 shows another embodiment of a display element of the present invention. The displacement-transmitting portion 5 includes a planar member *5a* and a spherical member *5b*.

Figure 5:
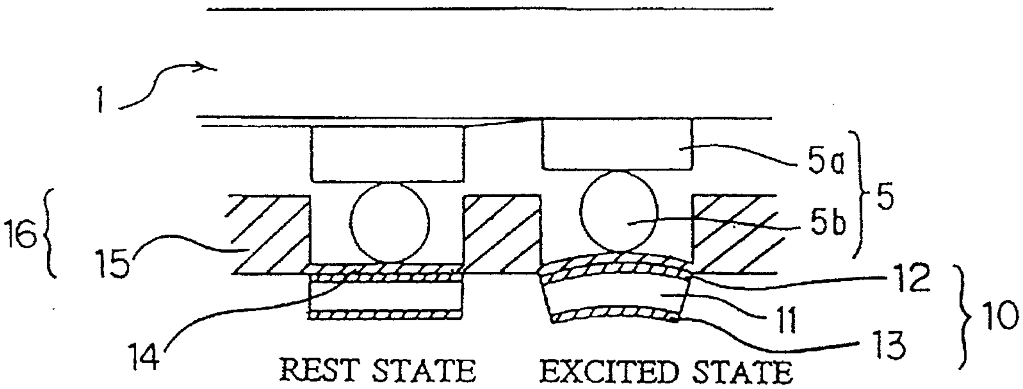
FIG. 5 is a schematic showing still another embodiment of a display element of the present invention.

FIG. 5 shows still another embodiment of a display element of the present invention. The displacement-transmitting portion 5 includes a planar member *5a* and a spherical member *5b* as well as the embodiment in FIG. 4. Further, the embodiment shows the reversed disposition of the actuators 10 and the substrate 16 in contrast with FIG. 1 and FIG. 4. In the embodiment shown in FIG. 5, the stationary portion 15 is not necessarily connected to the movable portion 14. The stationary portion 15 may just contact with the movable portion 14.

In FIG. 1, 4, and 5, the displacement-transmitting portion 5 is disposed close to the plate 1 when the actuator 10 is in a standing condition, and the displacement-transmitting portion 5 is disposed so as to contact with the plate 1 at a distance not longer than the wave length of the light.

Contrarily, it is also possible to dispose the displacement-transmitting portion 5 so as to contact with the plate 1 at a distance not longer than the wave length of the light when the actuator 10 is in a rest condition and so as to be close to the plate 1 when the actuator 10 is in an excited condition.

Figure 6:
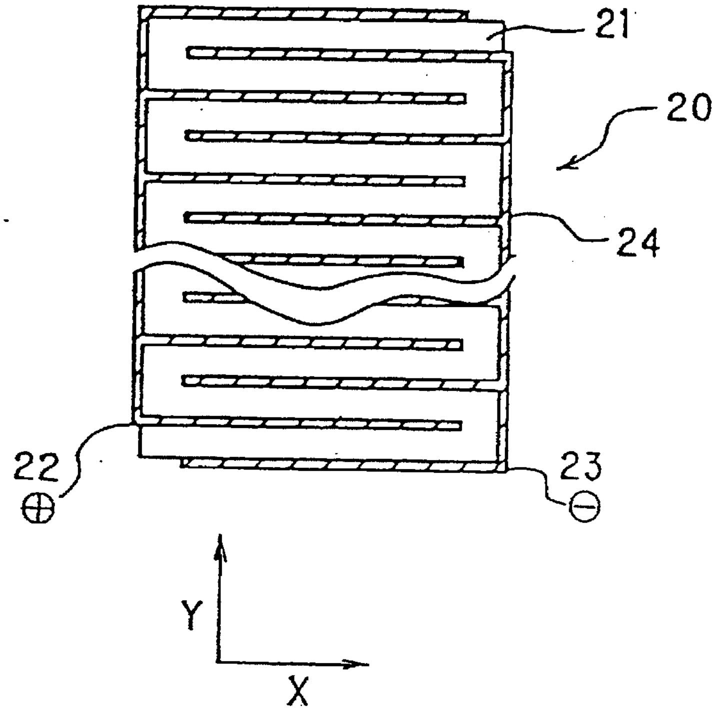
FIG. 6 is a schematic showing an embodiment of a laminated actuator of a display element (Invention C) of the present invention.

FIG. 6 shows an embodiment of a laminated actuator of a display element (Invention C) of the present invention. The laminated actuator 20 has a laminated piezoelectric body 24 including a plurality of ceramic piezoelectric layers 21, a plurality of electrode layers 22, and a plurality of electrode layers 23, wherein the piezoelectric layers 21 and the electrode layers 22 and 23 are laminated.

The electrode layers include a positive electrode 22 having a shape of connected layers and a negative electrode 23 having a shape of connected layers. The layers forming the positive electrode 22 and the layers forming the negative electrode 23 are independently connected so as to have the same polarities alternately.

The laminated piezoelectric body 24 having the aforementioned structure has both of a perpendicular and parallel directions of displacement to the direction of the lamination. In FIG. 6, the direction of the lamination is the direction Y.

When the direction of displacement is the direction Y, the size of the laminated piezoelectric body 24 should be enlarged to the direction Y in comparison with the size of the surface of the laminated layers. The amount of the displacement of the laminated piezoelectric body 24 equals to the total of the amount of the displacement in the direction of the thickness of each piezoelectric layer 21. The generating power equals to the total of the number of laminated layers.

On the other hand, when the direction of displacement is the direction X, the size of the laminated piezoelectric body 24 should be reduced to the direction Y in comparison with the size of the surface of the laminated layers. In other words, the size of the laminated piezoelectric body 24 should be enlarged to the direction X. The amount of the displacement of the laminated piezoelectric body 24 equals to the amount of the displacement of each piezoelectric layer 21. The total displacement is proportional to the number of laminations.

Figure 7:
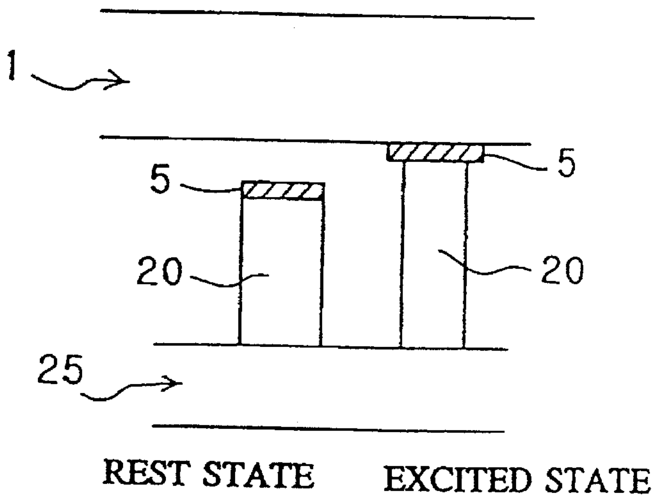
FIG. 7 is a schematic showing a laminated actuator in a rest condition and another laminated actuator in an excited condition of Invention C.

Note that when the direction of displacement is the direction Y and the direction of polarization of piezoelectric layers 21 is the same as that of the electric field during driving as shown in FIGS. 6 and 7, the displacement-transmitting portion 5 should be separated from the plate 1 in a rest condition. On the other hand, when the direction of polarization of the piezoelectric layers 21 is opposite to the direction of the electric field during driving, the displacement-transmitting portion 5 should contact to the plate 1. That is, the displacement-transmitting portion 5 should be separated from the plate 1 in an excited condition in which the light is not emitted.

When the direction of displacement is X, the condition of the disposition should be reversed.

The laminated actuator 20, as shown in FIG. 6, for a display element (Invention C) of the invention C does not include a movable portion as in the Invention A. The actuator 20 is supported by the fixed portion 25.

Next, the description is made on each portion composing the display element.

When the actuator 10 is excited, i.e., when voltage is applied into the upper and the lower electrodes 12 and 13, respectively, through lead portions, flexing displacement of the piezoelectric film 11 is exhibited, and the movable portion 14, as its link motion, moves in the vertical direction, i.e., in the direction toward the plate 1 and the cavity 17. The movable portion 14 preferably has a shape of plate since the shape is suitable for the flexing. The thickness of the plate preferably ranges from 1 to 100 μm, more preferably from 3 to 50 μm, furthermore preferably from 5 to 20 μm.

The flexing portion 14 is preferably made of a material having high thermal resistance so as to prevent the flexing portion from thermally degenerating during forming the piezoelectric film 11 when the actuator 10 is placed directly on the flexing portion 14 without any material therebetween having low heat resistance, such as an organic adhesive.

The flexing portion 14 is preferably made of an electrically insulated material. This is because the upper electrode 12 and the lower electrode 13 is electrically isolated when the upper electrode 12 and the lower electrode 13 of the actuator 10 supported directly by the flexing portion, leads connected to these electrodes, lead terminals, and the like are formed on the surface of the flexing portion 14. Therefore, the flexing portion 14 may be made of a metal having high thermal resistance, or a material such as enameled material which has a metal covered with ceramic such as glass. Most preferably, the flexing portion 14 is made of ceramic.

For example, stabilized zirconia, aluminum oxide, magnesium oxide, mullite, aluminum nitride, silicon nitride, glass, or the like can be suitably used for the movable portion 14. Stabilized zirconia is especially preferable because it has high mechanical strength and high toughness even if the vibrating portion is thin and has limited reactivity against a piezoelectric film and electrodes, etc.

Stabilized zirconia includes fully stabilized zirconia and partially stabilized zirconia. Stabilized zirconia does not cause phase transition since it has a crystallite of cubic phase. On the other hand, zirconium oxide causes phase transition between monoclinic crystals and tetragonal crystals at around 1000° C. This phase transition may generate cracks. Stabilized zirconia contains 1–30% by mole of calcium oxide, magnesium oxide, yttrium oxide, scandium oxide, ytterbium oxide, cerium oxide, or a stabilizer such as rare earth metal oxide. Preferably, the stabilizer contains yttrium oxide so as to enhance mechanical strength of the vibrating portion. The amount of yttrium oxide contained in the stabilizer ranges preferably from 1.5 to 6% by mole, more preferably from 2 to 4% by mole. Further, the main crystalline phase may be tetragonal crystals or mixture of tetragonal crystals and cubic crystals.

Ceramic for the flexing portion 14 preferably contains 0.5–5% by weight of silicon oxide, more preferably 1–3% by weight, because silicon oxide prevents an excessive reaction between the vibrating portion 14 and the actuator 10 upon forming the actuator 10 by thermal treatment and gives excellent properties as an actuator.

When the vibrating portion 14 is made of ceramic, numerous crystalline particles compose the vibrating portion. The average diameter of the particles ranges preferably from 0.05 to 2 μm, more preferably from 0.1 to 1 μm.

At least a part of the flexible portion 14 is fixed to the stationary portion 15 so that the flexible portion 14 can move. In the embodiment of FIG. 1, the stationary portion 15 is preferably made of ceramic. The ceramic material for the stationary portion 15 may be the same as that of the moving portion 14, or may be different from that of the moving portion 14. Stabilized zirconia, aluminum oxide, magnesium oxide, mullite, aluminum nitride, silicon nitride, glass, or the like, is suitable for the ceramic for the stationary portion 15 as well as a material for the moving portion 14.

A shape of a cavity 17 is not limited. A shape of a horizontal or vertical cross section of the cavity may be, for example, a circle, an oval, a polygon including a square and a rectangle, or a complex shape of combination thereof. However, when the shape is a polygon or the like, the edge of each corner is preferably removed so that each of the corners has a round shape.

The actuator 10 includes a piezoelectric film 11, the upper electrode 12 covering at least a part of a surface 11*s* of the piezoelectric film 11, and the lower electrode 13 covering at least a part of the other surface 11*t* of the piezoelectric film 11. The lower electrode 13 covers at least a part of the surface 14*s* of the moving portion 14.

The piezoelectric film 11 exhibits flexing displacement by applying voltage into the upper electrode 12 and the lower electrode 13. The piezoelectric film 11 preferably exhibits flexing displacement in the direction of its thickness. The flexing displacement of the piezoelectric film 11 causes the motion of the displacement-transmitting portion 5 in the direction of the thickness of the piezoelectric film 11, and the displacement-transmitting portion 5 contacts with the plate 1.

The piezoelectric film 11 preferably has a thickness of 5–100 μm, more preferably 5–50 μm, furthermore preferably 5–30 μm.

The piezoelectric film 11 may be suitably made of piezoelectric ceramic. Alternatively, the piezoelectric film 11 may be made of ceramic having electrostriction or ceramic having ferroelectricity. Further, the piezoelectric film may be made of a material that requires a treatment for polarization and a material that does not require a treatment for polarization. Furthermore, the material is not limited to ceramic and may be a piezoelectric body including a polymer represented by PVDF (polyvinylidene fluoride) or a composite body of a polymer and ceramic.

The ceramic for a piezoelectric film 11 may contain, for example, lead zirconate (PZT), lead magnesium niobate, lead nickel niobate, lead zinc niobate, lead manganese niobate, lead antimony stanate, lead titanate, manganese tungstate, and cobalt niobate, or a combination thereof. Needless to say, a ceramic may contain not less than 50% by weight of a compound consisting of these as a main component. A ceramic containing lead zirconate can be preferably used. Further, the aforementioned ceramic may be further include oxides of lanthanum, calcium, strontium, molybdenum, tungsten, barium, niobium, zinc, nickel, manganese, or the like; a combination thereof; or other compounds. For example, it is preferable to use ceramic containing a component mainly consisting of lead magnesium niobate, lead zirconate, and lead titanate, and further containing lanthanum and strontium.

The piezoelectric film 11 may be dense or may be porous. A porous piezoelectric film preferably has a porosity not more than 40%.

Note that a piezoelectric film 21 constitutes a part of the laminated actuator 20 in the display element of the aforementioned Invention C and in the display apparatus of the Invention D. The piezoelectric film 21 has a similar quality of a material and similar properties of the aforementioned piezoelectric film 11.

Each of the upper electrode 12 and the lower electrode 13 has a suitable thickness depending on its application. However, the thickness ranges preferably from 0.1 to 50 μm.

The upper electrode 12 is made of electrically conductive metal which is solid at room temperature. For example, the upper electrode 12 is made of a metallic simple substance of aluminum, titanium, chromium, iron, cobalt, nickel, copper, zinc, niobium, molybdenum, ruthenium, rhodium, silver, tin, tantalum, tungsten, iridium, platinum, gold, lead, or the like; or an alloy thereof. Needless to say, these elements may be contained in any combination.

The lower electrode 13 preferably made of a simple substance containing metal having a high melting point, such as platinum, ruthenium, rhodium, palladium, iridium, titanium, chromium, molybdenum, tantalum, tungsten, nickel, cobalt; or an alloy thereof. Needless to say, these metals each having a high melting point may be contained in any combination. A metal belonging to a platinum group such as platinum, rhodium, palladium, or an alloy containing these metals, such as silver-platinum, platinum-palladium is suitably used for the main component of a material for the electrode. A metal durable in an oxidizing atmosphere at high temperatures is preferably used for the lower electrode 13 because the lower electrode 13 is sometimes exposed to heat at a high temperature upon thermal treatment for the piezoelectric film 11.

A material suitably used for the lower electrode may be a cermet containing a metal having a high melting point and a ceramic such as alumina, zirconium oxide, silicon oxide, and glass.

In the display element of the Invention C and the display apparatus of the Invention D, the electrode layers 22 and 23 constituting a part of the laminated actuator 20 use the same material as that of the aforementioned upper electrode 12 and the lower electrode 13. The electrode layers 22 and 23 are thermally treated simultaneously with firing the piezoelectric layer 21 or at about the same temperature. The fixed portion 25 may be formed of the same material as the aforementioned material for the fixing portion 15. The fixed portion 25 is preferably a part of the laminated actuator 20.

The upper electrode 12 of the actuator 10 or the displacement-transmitting portion 5 connected with the laminated actuator 20 contacts to the back surface 4 of the plate 1 corresponding to the displacement of the actuator 10 or the laminated actuator 20, respectively.

When the displacement-transmitting portion 5 contacts to the back surface 4 of the plate 1, the light 2 having totally reflected in the plate 1 penetrates the back surface 4 of the plate 1, reaches to the surface of the displacement-transmitting portion 5, and reflects on the surface of the displacement-transmitting portion 5. Thus, the displacement-transmitting portion 5 is for reflecting the light 2 penetrating the back surface 4 of the plate 1 and for making the area contacting with the plate 1 larger than the predetermined size. That is, the area of light emission is determined by the area of contacting the displacement-transmitting portion 5 and the plate 1. "Contact" means that the displacement-transmitting portion 5 and the plate 1 are placed within the distance not longer than the wave length of the light.

The displacement-transmitting portion 5 preferably has a sufficient hardness to transmit the displacement of the actuator 10 to the plate 1 directly.

Therefore, the material for the displacement-transmitting portion 5 is preferably rubber, organic resin, glass, etc., to give the aforementioned properties. However, the material may be the electrode layers itself, the piezoelectric body, the aforementioned ceramics, or the like.

Preferably, the surface, to contact with the plate 1, of the displacement-transmitting portion 5 is satisfactorily flat in comparison with the amount of displacement of the actuator 10. To be specific, the unevenness is preferably not larger than 1 μm, more preferably not larger than 0.5 μm, furthermore preferably not larger than 0.1 μm. The flatness is important to reduce the gap when the displacement-transmitting portion 5 contacts with the plate 1. Therefore, the degree of unevenness is not limited to the aforementioned ranges when the contacting portion is deformed in a contacting condition.

The plate 1 of the present invention is required to have a refractive index for total reflection of the light introduced into the plate 1 at the front surface 3 and the back surface 4 of the plate 1.

The material is not limited as long as the material has such properties. Specifically, the popular materials are, for example, glass, quartz, translucent plastic, translucent ceramic, a laminated body of layers having varied refractive indexes, and a plate having a coating layer on the surface.

The present invention provides a display apparatus capable of expressing any letter, any figure, etc., as well as a conventional CRT and a liquid crystal by disposing the predetermined number of aforementioned display elements suitably and controlling the switching-on and switching-off of each of the display elements. The number of display elements is not necessarily plural and may be only one.

The method for producing a display element of the present invention is hereinbelow described.

Shaped layers of green sheet or green tape are laminated by hot pressing or the like and then sintered to obtain a unitary substrate 16. For example, in the substrate 16 of FIG. 1, two-layered green sheets or green tapes are laminated. To the second layer, a throughhole having a predetermined shape is made in advance before laminating so that the cavity 17 is formed. The shaped layers are formed by press molding, slip casting, injection molding, or the like. The cavity may be formed by machining such as cutting, machining of metals, laser machining, blanking by press working, or the like.

The actuator 10 is formed on the movable portion 14. A piezoelectric body is formed by press molding using a mold, tape forming using a slurry, or the like. The green piezoelectric body is laminated on the movable portion 14 of the green substrate by hot pressing and is sintered simultaneously so as to form a substrate and a piezoelectric body. This method requires to form the electrodes 12 and 13 in advance on the piezoelectric body by one of the methods for forming a film described later.

Though a temperature for sintering a piezoelectric film 11 is suitably determined depending on the materials composing the film, the temperature ranges generally from 800° C. to 1400° C., preferably from 1000° C. to 1400° C. Preferably, the piezoelectric film is sintered under the presence of a source for evaporating the material of the piezoelectric film so as to control the composition of the piezoelectric film 11.

On the other hand, in a method for forming a film, the lower electrode 13, the piezoelectric film 11, and the upper electrode 12 are laminated on the movable portion 14 in this order to form the actuator 10. A method for forming a film may be suitably selected from methods in conventional art, for example, a method for forming a thick film such as screen printing, an applying method such as dipping, a method for forming a thin film such as ion beam, sputtering, vacuum deposition, ion plating, chemical vapor deposition (CVD), plating. However, a method for forming a film is not limited to these methods. The lower electrode 13, the unillustrated lead, and terminal pad are simultaneously applied to the substrate by screen printing. Preferably, the piezoelectric film 11 is formed by a method for forming a thick film, such as screen printing or the like. These methods use a paste or a slurry containing ceramic powders of the material for the piezoelectric-film as a main component. Therefore, the piezoelectric film 11 is formed on the substrate so as to have excellent piezoelectric properties. Forming a piezoelectric film by one of these methods for forming films does not require any adhesive, and the actuator 10 can be unitarily connected with the vibrating portion 14. Therefore, such a method is particularly preferable in view of excellent reliability, excellent reproducibility, and easy integration. A shape of such a film may be suitably patterned. A pattern may be formed by a method such as screen printing or photolithography or by removing unnecessary parts by machining such as laser machining, slicing, ultrasonication.

The shapes for the piezoelectric film, the upper electrode, and the lower electrode are not limited at all, and any shape may be selected depending on its application. For example, they may be a polygon such as a triangle and a square, a curved shape such as a circle, an oval, and a toms, a comblike shape, a lattice, or a combination thereof to form a special shape.

Each of the films 11, 12, 13, which are thus formed on a substrate, may be thermally treated, respectively, each time that the film is formed, so that the film and substrate are unitarily connected. Alternatively, after all the films are formed, the films may be thermally treated altogether so as to integrally connect the films to the substrate. When the upper electrode or the lower electrode is formed by a method for forming a thin film, the thermal treatment is not always necessary to form these electrodes unitarily.

When an aforementioned material is used for the displacement-transmitting portion 5, the displacement-transmitting member made of an aforementioned material may be laminated on the actuator 20 by means of an adhesive. Alternatively, a solution or a slurry of an aforementioned material is coated on the actuator 10. It is not always necessary to cut the displacement-transmitting portion so as to have almost the same shape as the actuator 10. However, it is preferable to cut the layer of the displacement-transmitting portion 5 or to notch the layer so as to enhance the efficiency of the displacement of the actuator 10.

Needless to say that the predetermined distance between the displacement-transmitting portion 5 and the plate 1 after assembling is required to be small in comparison with the degree of displacement of the actuator 10. A gap-forming member having a predetermined size is disposed in the portion without the actuator 10 so that the fixing portion 15 is tightly connected to the plate 1.

The laminated actuator 20 shown in FIG. 6 can be produced in the same manner as the actuator 10. The laminated actuator 20 can be connected to the displacement-transmitting portion 5 can be supported by the fixed portion 25 in the same manner as the aforementioned Inventions A and B.

The laminated actuator 20 preferably has a fixed portion 25 as a part of the laminated actuator. Therefore, the fixed portion 25 is not always necessary. Most preferably, the predetermined number of the piezoelectric layers 21 each having an electrode on one surface thereof are laminated to form a laminated body, which is fired and then cut a predetermined portion of the thickness of the laminated body so as to form a plurality of laminated actuators 20. Alternatively, the piezoelectric layers 21 and the electrode layers 22 and 23 are laminated alternately on the substrate which does not exist during firing, followed by exfoliating the laminated body from the substrate so as to fire the laminated body. Further, the laminated body may be cut before firing.

According to the present invention, light emission is controlled by using a displacement caused by a piezoelectric effect of a piezoelectric film and a piezoelectric layer. Therefore, the present invention provides a display element and a display apparatus both having quick response, consuming little electric power and having a small size, and having high brightness of a screen. Further, a colored screen does not need to increase the number of picture elements in comparison with a monochrome screen. The display element and the display apparatus can be applied to other articles such as a switch for light.

Though the present invention has been described specifically on the basis of some embodiments, the present invention should not be limited to the embodiments described above. It should be understood that various alterations, modification, improvements, or the like can be made based on the knowledge of a person having ordinary skill in the art as long as they do not deviate from the scope of the present invention.

What is claimed is:

1. A display element for selectively emitting light, comprising:

an actuator including a piezoelectric film and a pair of electrodes coated onto at least a portion of a pair of respective surfaces of said piezoelectric film;

a flexing portion, in contact with one of said pair of electrodes, for supporting said actuator;

a fixed portion for holding said flexing portion so that said flexing portion can move;

displacement-transmitting means connected to said actuator for transmitting a displacement of said actuator; and a plate for transmitting and selectively emitting light, disposed closely to said displacement-transmitting means;

wherein light is emitted from said plate at a position corresponding to a contact point between said displacement-transmitting means and said plate, and wherein contact between said displacement-transmitting means and said plate is caused by selectively applying a voltage to, and thus causing displacement of, said actuator.

2. A display element of claim 1, wherein said flexing portion and said fixed portion are portions of a ceramic substrate having a unitary structure, and said ceramic substrate is formed with a cavity that provides said flexing portion with a thin, plate shape.

3. A display apparatus comprising a plurality of display elements for selectively emitting light, each of said display elements comprising:

an actuator including a piezoelectric film having a pair of surfaces and a pair of electrodes coated onto at least a portion of a pair of respective surfaces of said piezoelectric film;

a flexing portion, in contact with one of said pair of electrodes, for supporting said actuator;

a fixed portion for holding said flexing portion so that said flexing portion can move;

displacement-transmitting means connected to said actuator for transmitting a displacement of said actuator; and a plate for transmitting and selectively emitting light, disposed closely to said displacement-transmitting means;

wherein light is emitted from said plate at a position corresponding to a contact point between said displacement-transmitting means and said plate, and wherein contact between said displacement-transmitting means and said plate is caused by selectively applying a voltage to, and thus causing displacement of, said actuator.

4. A display apparatus of claim 3, wherein a number of said display elements for displaying black and white is substantially the same as the number of said display elements for displaying color.

* * * * *